UNITED STATES PATENT OFFICE.

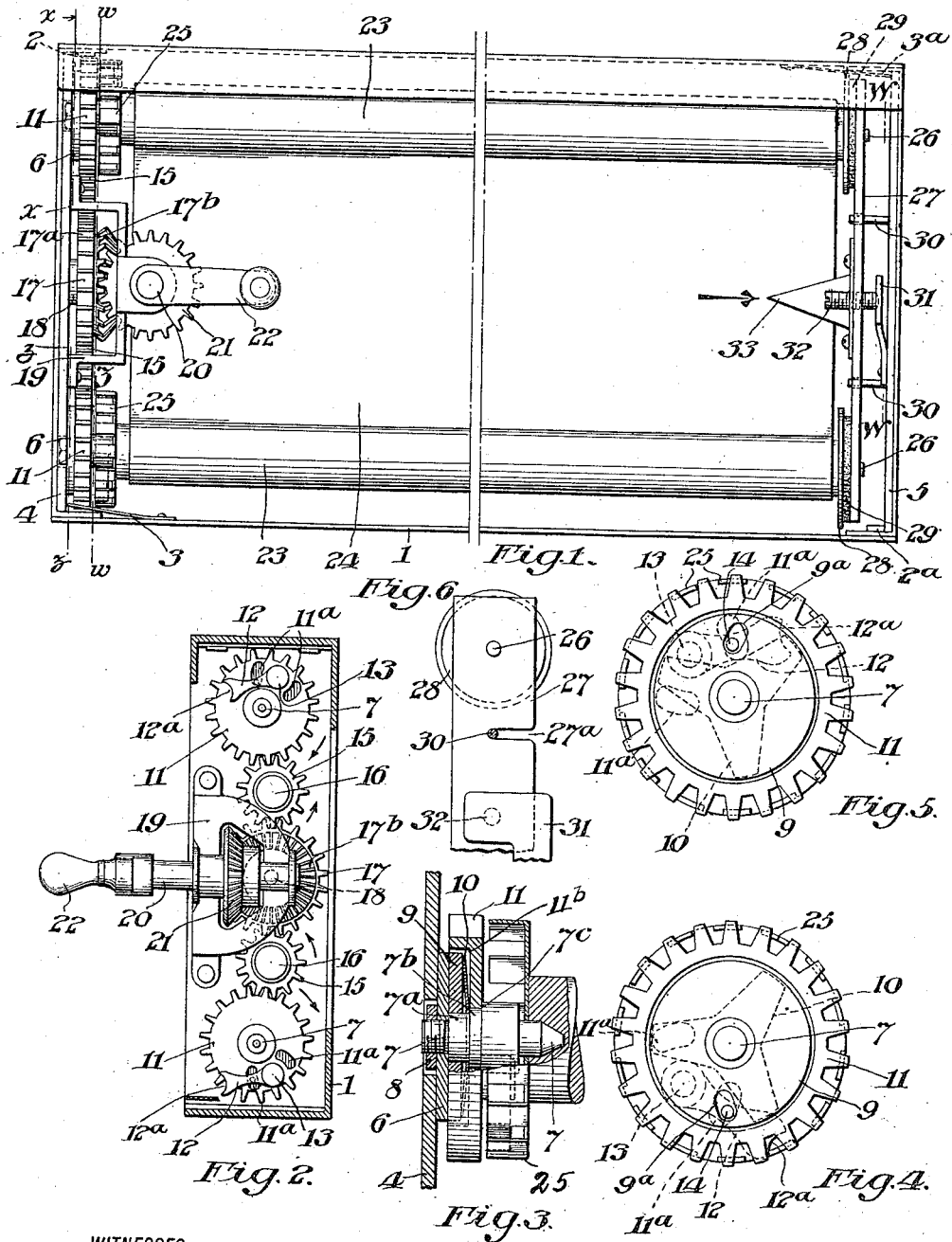

LORENZO H. PIKE, OF PHILADELPHIA, PENNSYLVANIA, ASSIGNOR TO ELECTRIC SERVICE SUPPLIES COMPANY, OF PHILADELPHIA, PENNSYLVANIA, A CORPORATION OF PENNSYLVANIA.

DISPLAY-SIGN.

1,181,405.     Specification of Letters Patent.     Patented May 2, 1916.

Application filed November 25, 1914. Serial No. 873,884.

*To all whom it may concern:*

Be it known that I, LORENZO H. PIKE, a citizen of the United States, residing in the city of Philadelphia, county of Philadelphia, and State of Pennsylvania, have invented certain Improvements in Display-Signs, of which the following is a specification.

My invention is designed more particularly to provide improved means, of simple character, readily dissociated and assembled, for use on electric or other car and transportation lines to indicate streets, places of destination or other information, but it is adapted for use where curtains and the like are to be operated in reverse directions, or where it is desired to use an efficient positive drive with a frictionally restrained reverse movement within the scope of the claims.

In the accompanying drawings, Figure 1 is a sectional elevation of apparatus embodying my improvements. Fig. 2 is a sectional view taken on the line $w$—$w$ of Fig. 1, Fig. 3 is a broken part sectional elevation of mechanism for operating one of the curtain rollers shown in Fig. 1, Fig. 4 is an enlarged sectional view taken on the line X—X of Fig. 1, Fig. 5 is an enlarged sectional view taken on the line Z—Z of Fig. 1, and Fig. 6 is a sectional view on the line W—W.

The invention, in the form thereof illustrated in the drawings, comprises a case 1 provided with the lugs 2 and $2^a$ and with the springs 3 and $3^a$ in combination with the bearing plates 4 and 5, the plate 4 being detachably connected in an end of the case by the parts 2 and 3 and the plate 5 being detachably connected in the other end of the case by the parts $2^a$ and $3^a$. Bearings 6 are fixed to the plate 4 and arbors 7 are screwed into these bearings, the arbors having nuts 8 screwed thereon against the bearings and within the plates. Friction disks 9 are journaled on the arbor sections $7^a$, in contact with the bearings 6; dished springs 10 are placed on these arbor sections in position to press the disks against the bearings, and gear wheels 11 having the recesses $11^d$ are journaled on the arbor sections $7^b$, where they are held by the arbor flanges or collars $7^c$, the recesses receiving the disks together with the springs. Reversely disposed pawls 12, having the end notches $12^a$, are pivoted on the bearings 13 carried by the respective wheels 11. The pawls 12 are provided with the studs 14 which pass through slots $11^a$ of the respective wheels 11 into engagement with oppositely disposed cam slots $9^a$ in the disks 9, each wheel being provided with two slots $11^a$ concentric to the bearings 13 to permit their use interchangeably. Idler gears 15 are journaled on studs 16, carried by the plate 4, and engage the gears 11. A gear 17 is journaled on an arbor 18, carried by the plate 4 and a bracket 19 fixed thereto, the gear having the spur teeth $17^a$ which engage the gears 15. A shaft 20 is journaled in the bracket 19, and has the bevel gear 21 fixed thereon in engagement with bevel teeth $17^d$ on the gear 17 and is provided with the handle 22, by which the gear trains are revolved. Rollers 23, connected by the curtain 24, are at one end journaled on the arbors 7 and provided with the ratchets 25, the teeth of which lie in circles containing the pawls 12 and extend from the ends of the rollers parallel thereto. These rollers have fixed on the other ends thereof the arbors 26 journaled in the plate 27 and the flanges or disks 28 engaged by the friction disks 29 fixed on the plate. Studs 30, fixed to the plate 5, carry the plate 27 which is provided with the notches $27^a$ for engaging the studs, the notches permitting the plate to be adjusted along the studs and moved transversely thereto. A spring 31 is fixed to the plate 5 and a stud 32 is screwed into the plate 27 so as to engage the spring and hold the latter plate in position. A pointer 33, fixed to the plate 27, is adapted to coact with marks on the curtain for positioning it.

When the handle 22 is turned clockwise, the gears are turned in the direction of their respective arrows. In the lower mechanism, the cam slot $9^a$ acts through the engaging stud 14 to throw the pawl 12 outward so that its notch $12^a$ positively engages the corresponding ratchet 25, whereby the lower roller 23 is turned to wind the curtain 24 thereon and draw it off the upper roller, the upper cam slot $9^a$ positively withdrawing the corresponding pawl 12 from contact with its ratchet 25. In this operation, the upper roller turns freely (to pay off the curtain) excepting as it is retarded by the action of the corresponding washer 29 on the disk 28, which is regulated by the spring 31 and the stud 32, for the upper pawl runs backward and rides under the corresponding ratchet 25 without contact therewith. The section of the curtain between the rollers is kept taut, by the action of the braking mechanism, while the desired differential movement of the rollers, due to the different lengths of the curtain wound thereon from time to time, is obtained.

A characteristic feature of the invention resides in the fact that the operation of the handle in either direction operates the pawls positively in reverse directions and that the pawls are not operated by the drag of the curtain or otherwise than by the positive actions communicated thereto from the handle. It will be understood that when the handle 22 is turned anti-clockwise, the same operation takes place in the reverse direction.

The apparatus can be readily assembled and dissociated, due to the readiness with which the holding stud 32 can be engaged or disengaged relatively to the spring 31, to the movable relation of the plate 27 relatively to the parts 26 and 30, the movable relation of the rollers 23 relatively to the arbors 7, and the movable relation of the plates 4 and 5 relatively to the case 1.

Having described my invention, I claim:

1. The combination with a pair of journaled rollers having ratchets thereon and a curtain connecting said rollers, of reversely disposed pawls disposed for coacting with said ratchets, wheels on which said pawls are mounted, means for simultaneously revolving said wheels, and means for positively shifting said pawls in opposite directions, one of said pawls being shifted into engagement with its ratchet and the other of said pawls being shifted out of engagement with its ratchet.

2. The combination with a pair of journaled rollers having ratchets thereon and a curtain connecting said rollers, of reversely disposed pawls adapted for coacting with said ratchets, wheels on which said pawls are mounted, reversely disposed cams relative whereto said wheels are adapted to turn, and means whereby said cam shifts said pawls oppositely into and out of engagement with said ratchets.

3. The combination of a pair of arbors, rollers having ends connected with said arbors, ratchets on said rollers concentric with said arbors, wheels on said arbors, means for simultaneously revolving said wheels, oppositely disposed pawls carried by said wheels and adapted for coacting with the respective ratchets, oppositely disposed cams adapted to turn relatively to said wheels, and means whereby said cams are adapted to shift said pawls simultaneously in opposite directions.

4. The combination of a pair of stationary arbors, rollers having ends pivoted on said arbors, ratchets fixed to said ends substantially concentric to said arbors, a curtain connecting said rollers, means for retarding the movements of said rollers, wheels journaled on the respective arbors, pawls carried by said wheels and adapted for engagement with the respective ratchets, means for revolving said wheels simultaneously, and means comprising cams revoluble on said arbors relatively to said wheels whereby said pawls are alternately moved into engagement with said ratchets when said wheels are revolved in opposite directions.

5. The combination with an arbor and a display device, of a ratchet connected with said display device and revoluble relatively to said arbor, a wheel revoluble on said arbor, a pawl carried by said wheel, a device adapted to turn on said arbor relatively to said wheel, a spring for frictionally retarding said device, and means whereby said device shifts said pawl into engagement with said ratchet.

6. The combination with a roller having ratchet teeth concentric thereto, a display device operable by said roller, an arbor on which said roller is pivoted, a wheel journaled on said arbor, a pawl pivoted on said wheel, a disk having a cam slot therein adapted to turn on said arbor independently of said wheel, a spring for frictionally controlling said disk, and a stud fixed to said pawl and engaged by said slot, whereby the revolution of said wheel in opposite directions moves said pawl into and out of engagement with said ratchet.

7. The combination of a case, a plate, means for holding said plate in said case, an arbor fixed to said plate, a bearing fixed relatively to said plate, a cam disk adapted to turn on said arbor in contact with said bearing, a recessed wheel adapted for receiving said disk and for turning on said arbor relatively to said disk, a spring between said wheel and disk, a pawl pivoted on said wheel, a stud on said pawl and engaged by said cam disk, a display device, and a ratchet connected with said display device and adapted to be engaged by said pawl through the action of said cam disk on said stud in turning said wheel in one direction.

8. The combination of a pair of rollers and a curtain connecting said rollers, of an operating device and means comprising independent clutching mechanisms adjacent to ends of the respective rollers and connecting said operating device with the respective rollers, said means being actuated by turning said operating device in reverse directions to positively engage and disengage said clutching mechanisms alternatively.

9. The combination of a pair of rollers, a curtain connecting said rollers, and means for supporting and positioning said rollers and curtain, said means comprising a plate, studs on which said plate is movably mounted, a stud carried by said plate and a spring fixed relatively to said stud last named and detachably engaged thereto.

In testimony whereof I affix my signature in presence of two witnesses.

LORENZO H. PIKE.

Witnesses:
W. J. JAMISON,
ROBERT C. HENRY.

Copies of this patent may be obtained for five cents each, by addressing the "Commissioner of Patents, Washington, D. C."

It is hereby certified that in Letters Patent No. 1,181,405, granted May 2, 1916, upon the application of Lorenzo H. Pike, of Philadelphia, Pennsylvania, for an improvement in "Display-Signs," an error appears in the printed specification requiring correction as follows: Page 2, line 55, claim 2, for the words "cam shifts" read *cams shift;* and that the said Letters Patent should be read with this correction therein that the same may conform to the record of the case in the Patent Office.

Signed and sealed this 30th day of May, A. D., 1916.

[SEAL.]
J. T. NEWTON,
*Acting Commissioner of Patents.*